Aug. 4, 1953

L. P. FROST 2,647,270

BALK CONNECTOR

Filed Jan. 7, 1949

Inventor
Lester P. Frost

Attorneys

Aug. 4, 1953  L. P. FROST  2,647,270
BALK CONNECTOR
Filed Jan. 7, 1949  4 Sheets-Sheet 2
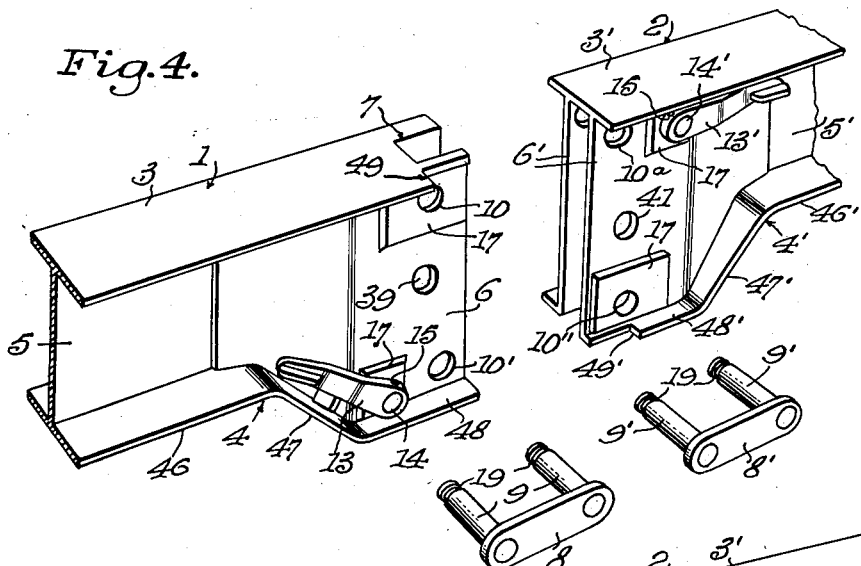
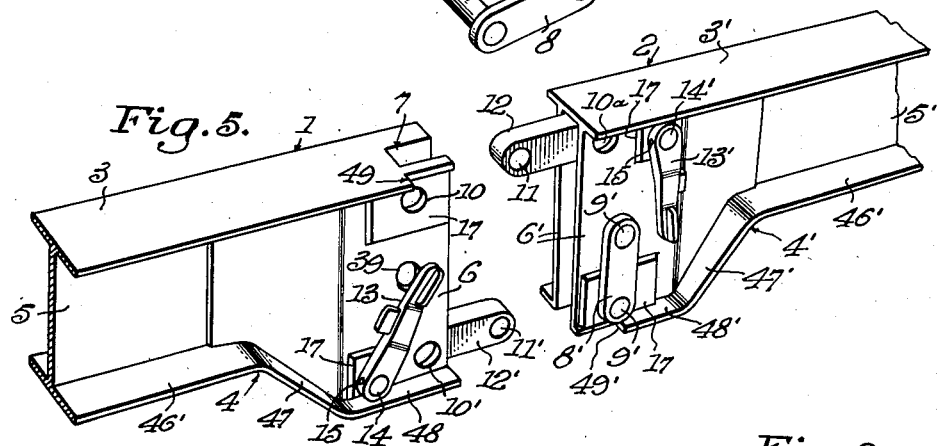
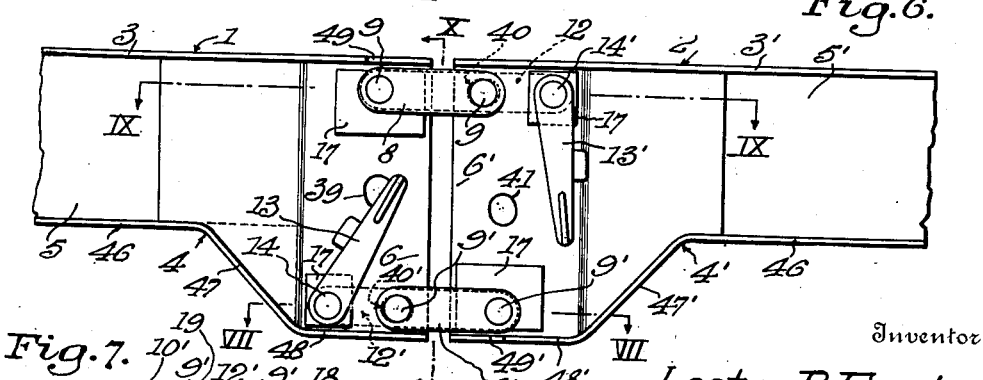
Inventor
Lester P. Frost
Attorneys

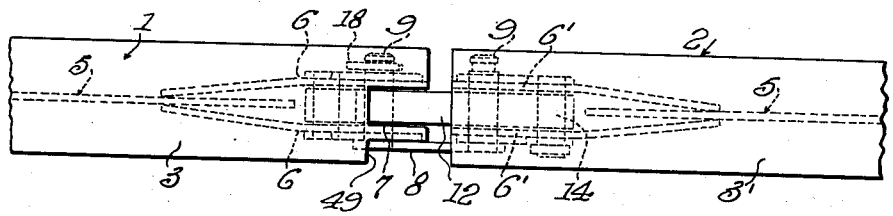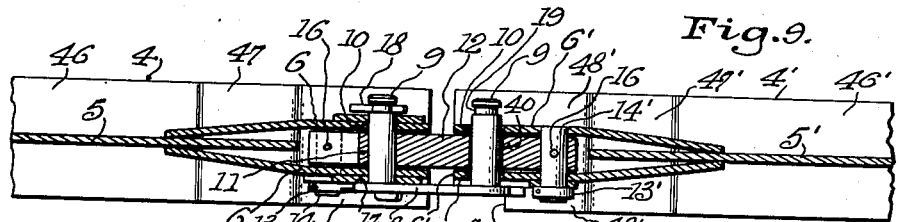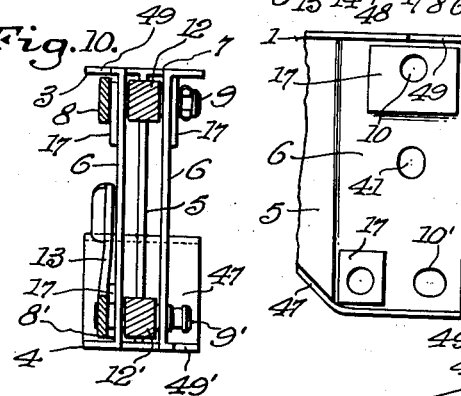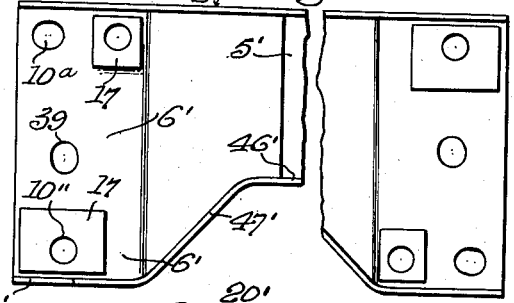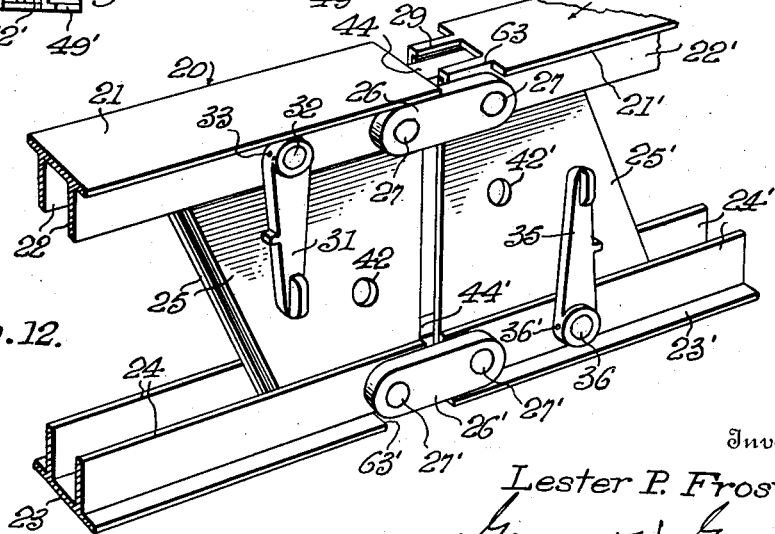

Aug. 4, 1953 L. P. FROST 2,647,270
BALK CONNECTOR
Filed Jan. 7, 1949 4 Sheets-Sheet 4
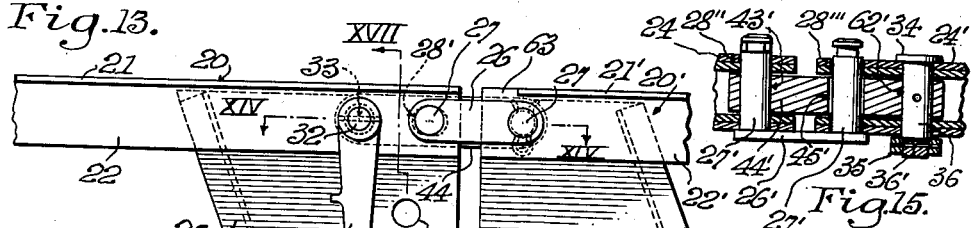
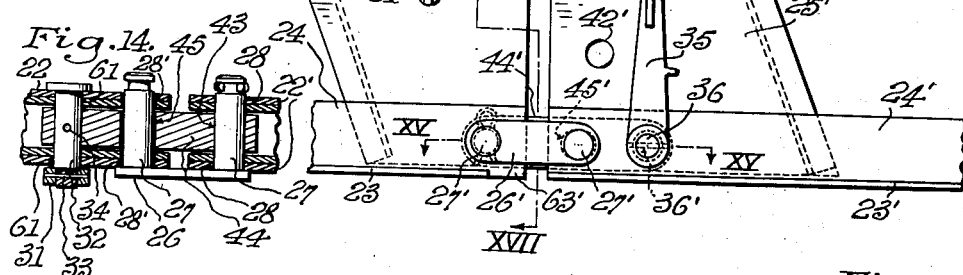
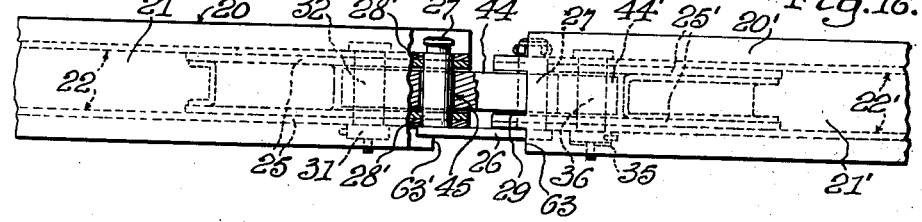
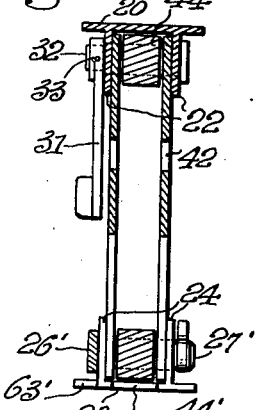
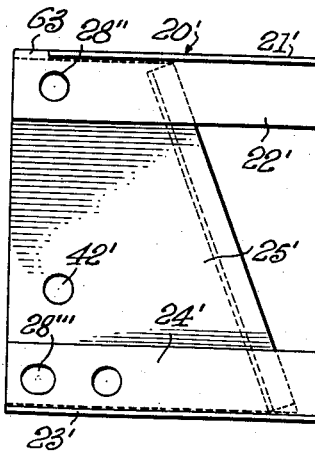
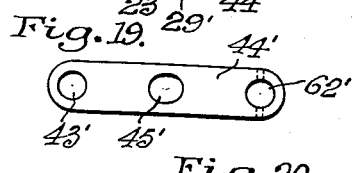
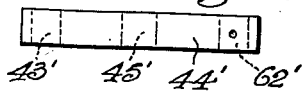
Inventor
Lester P. Frost
By George W. Gardes
Attorneys Patented Aug. 4, 1953

2,647,270

UNITED STATES PATENT OFFICE 2,647,270

BALK CONNECTOR

Lester P. Frost, Placerville, Calif.

Application January 7, 1949, Serial No. 69,767

15 Claims. (Cl. 14—13)

(Granted under Title 35, U. S. Code (1952), sec. 266)

The invention described herein may be manufactured and used by or for the Government for governmental purposes, without payment to me of any royalty thereon.

The present invention provides improved connecting means for connecting together adjacent ends of structural members in either fixed or floating bridges, such as balk beams or stringers, which carry the flooring of a bridge. Thus, timber placed lengthwise in a trestle or a floating bridge upon which the floor of the bridge is laid customarily is termed "balk," and the present invention provides means for rapidly and easily interconnecting adjacent ends of such timbers or stringers to form a full length floor-mounting structure; while the term "balk" is used in bridge construction to designate floor-supporting timbers the term as used in the present description is intended to have a broader scope or application than just to timbers, as the balk or stringer members may be made of steel, or any other suitable material of requisite strength, and all of such materials are indicated as being includable under the term "balk."

As has been indicated above, the invention has for one of its objects the provision of balk-connecting means for effecting rapid and expeditious interconnecting adjoining ends of balk to form a continuous floor-supporting structure of requisite length and strentgh.

A further object of the invention is to provide means for connecting together adjacent ends of balk in such manner that a section of the bridge may be removed laterally out of the completed bridge without undue difficulties in order to replace a damaged section of the bridge.

A still further object of the invention is to provide connector means which are self-contained within the balk members.

A still further object of the invention is to provide balk members in which the abutting ends thereof are hingeably connected together either above or below the continuous horizontal plane of the upper surfaces of the balk members.

Further objects of the invention will become apparent as the description proceeds, and the features of novelty will be pointed out in particularity hereinafter.

The invention will be understood more readily by reference to the accompanying drawings which show illustrative embodiments of this invention.

In the drawings:

Fig. 4 is a perspective view of the structure of Fig. 1, but showing the parts in disassembled relation;

Fig. 5 is a perspective view similar to Fig. 4 but showing the parts in position for assembly;

Fig. 6 is a side elevation of Fig. 1;

Fig. 7 is a horizontal, fragmentary sectional view taken on the line VII—VII of Fig. 6, looking the direction of the arrows and showing details of the bottom locking assembly;

Fig. 8 is a fragmentary top plan view illustrating the details of the top locking instrumentalities;

Fig. 9 is a horizontal sectional view on the line IX—IX of Fig. 6, looking in the direction of the arrows;

Fig. 10 is a sectional elevation taken on the line X—X of Fig. 6, looking in the direction of the arrows;

Fig. 11 is a fragmentary side elevation of the adjoining ends of the balk members having all of the locking means removed therefrom;

Fig. 12 is a perspective view of a modified form of connecting means including the improved features of the invention;

Fig. 13 is a side elevation of the modification shown in Fig. 12, both of these views showing the locking means in locking position;

Fig. 14 is a horizontal sectional view taken on the line XIV—XIV of Fig. 13;

Fig. 15 is a horizontal section taken on the line XV—XV of Fig. 13;

Fig. 16 is a plan view, partially in section, of the modified form of connector;

Fig. 17 is a vertical, sectional elevation taken on the line XVII—XVII of Fig. 13, looking in the direction of the arrows;

Fig. 18 is a fragmentary side elevation of the modified form of balk connector of Figs. 12 and 13, with the locking means removed;

Fig. 19 is a plan view of a connecting link forming a part of the improved construction;

Fig. 20 is a side elevation of the link of Fig. 19;

Fig. 21 is a side elevation of a stud shaft employed in the present construction; and Fig. 22 is a side elevation of a tie bar and mounting stud shafts therefor, employed in the present construction.

Figure 1:
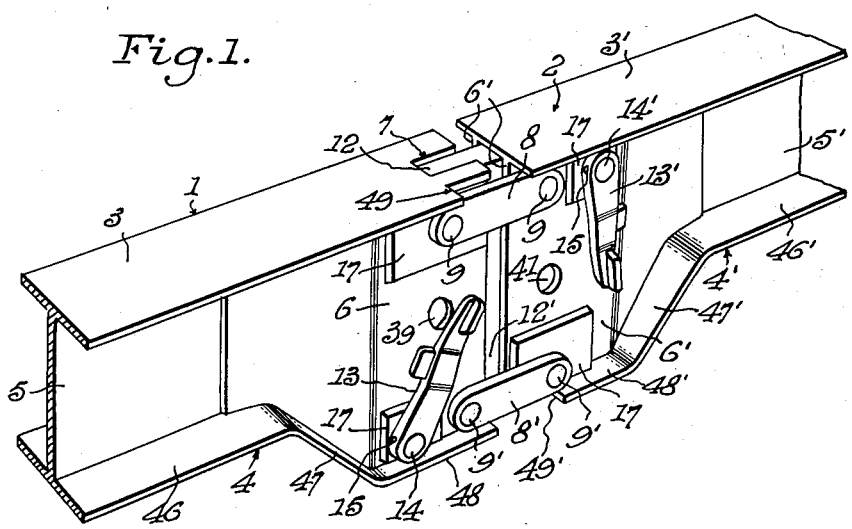
Fig. 1 is a perspective view of one side of two balk member connected together by means of the improved connector of this invention.
Figure 2:
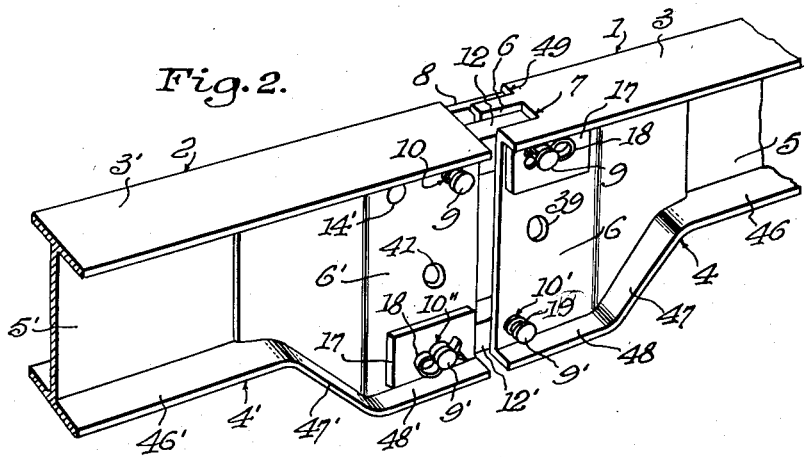
Fig. 2 is a perspective view of the assembly of Fig. 1, the view illustrating the opposite side of the assembly relative to the showing of Fig. 1.

Referring more particularly to the drawings, and first to Figs. 1 to 11 inclusive, there is shown one form of balk members, 1 and 2, having one form of the improved connector of this invention embodied therein, and including upper horizontal flanges 3, 3' and bottom flanges 4 and 4', said bottom flanges 4 and 4', including horizontal portions 46 and 46' and bent portions 47 and 47' which extend inwardly and downwardly to lower horizontal end portions 48 and 48'. A cut-out portion 49 is provided on the inner end of the upper horizontal flange 3 of the balk member 1 adjacent to a cut-out portion 7, and a cut-out portion 49' is provided on the inner end of the horizontal portion 48' on the bottom flange 4' of the balk member 2 for a purpose which will hereinafter appear. The cut-out portion 7 is formed in the adjoining end of the balk member 1 on the upper horizontal flange 3 thereof. The balk members 1 and 2 are also provided with vertically-extending, parallel end portions 5 and 5', respectively. The adjoining ends of the balk members 1 and 2 are enlarged and provided with spaced vertically-extending, parallel side plates 6 and 6' respectively, which side plates 6 and 6' diverge inwardly at their outer ends and abut against the vertical end portions 5 and 5' as illustrated in Figs. 7 and 8. The adjoining ends of the balk members 1 and 2 are connected together by means of upper and lower tie bars 8 and 8' having spaced parallel pins 9 and 9' respectively thereon. One of the pins 9 of the upper tie bar 8 is adapted to be inserted in an upper hole 10 formed in the side plates 6 of the balk member 1 and also to pass through a hole 11 provided in one end of an upper connector link 12; and the other pin 9 of the tie bar 8 is adapted to be inserted in slightly elongated holes 10a in the side plates 6' of the balk member 2 and to pass through a slightly elongated hole 40 substantially in the middle of the upper connector link 12. One of the pins 9' of the lower tie bar 8' is adapted to be inserted in slightly elongated holes 10' in the lower portions of the side plates 6' of the balk member 1 and also to pass through a slightly elongated hole 40' substantially in the middle of a lower connecting link 12' and the other pin 9' on the lower tie bar 8' is adapted to be inserted in holes 10" in the lower portion of the balk member 2 and to pass through a hole 11' in one end of the lower connecting link 12'.

On the lower portion of a side plate 6 of the balk member 1 is mounted an operating handle 13 and on the upper portion of a side plate 6' of the balk member 2 is mounted an operating handle 13', with one end of each of the operating handles 13 and 13' fitted on one end of each of operator shafts or studs 14 and 14' respectively, and held in place thereon by means of locking pins 15. One of each of the operator shafts 14 and 14' passes through one of each of the other ends of the connecting links 12 and 12', respectively, and are attached thereto by locking pins 16, more particularly illustrated in Fig. 9. The tie bars 8 and 8' and operating handles 13 and 13' operate against wear members 17 mounted on the sides of the vertical side plates 6 and 6' of the balk members 1 and 2. In order to prevent the pins 9 and 9' of the upper and lower tie bars 8 and 8' from working out of their holes 10 and 10', in the side plates 6 and 6', the free ends of the tie bar pins 9 and 9' which extend through the opposite sides of the balk plates 6 and 6' are provided with locking clips 18, which are slipped into grooves 19 formed on the ends of the pins 9 and 9', as more particularly shown in Fig. 2.

Referring to Figs. 12 to 18, inclusive, the balk members 20 and 20', which are of a modified form from those disclosed in Figs. 1 to 11, inclusive, consist of upper, horizontally-extending portions 21 and 21', having a pair of spaced flanges 22 and 22', respectively, extending downwardly therefrom, and lower horizontally extending portions 23 and 23', with spaced flanges 24 and 24', respectively, extending upwardly therefrom. The upper and lower horizontally extending portions 21 and 23' of the balk members 20 and 20', respectively, are connected together by pairs of spaced vertically extending plates 25 and 25' which are beveled at their outer ends and the adjoining ends of the balk members are connected together by upper and lower tie bars 26 and 26', having pairs of spaced pins 27 and 27' respectively provided thereon.

One of the pins 27 of the upper tie bar 26 is adapted to be inserted in holes 28 in the flanges 22' of the balk member 20' and through a hole 43 in one end of an upper link 44; and the other pin 27 of the upper tie bar 26 is adapted to be inserted in slightly elongated holes 28' in the upper flanges 22 of the balk member 20 and to extend through a slightly elongated hole 45 substantially in the middle of the link 44. One of the pins 27' of the lower tie bar 26' is adapted to be inserted in holes 28" in the lower flanges 24 of the balk member 20 and to pass through a hole 43' in one end of the lower connector link 44'; and the other pin 27' of the lower tie bar 26' is adapted to be inserted in slightly elongated holes 28''' in the lower flanges 24' of the balk member 20' and to pass through a slightly elongated opening 45' in the middle of the link 44'.

An operating handle 31 is fitted on one end of a shaft 32 extending through openings 61 formed in the downwardly extending flanges 22 of the upper horizontally extending portion 21 of the balk member 20 and held in place thereon by pin 33. The shaft 32 also passes through a hole in the other end of the upper connecting link 44 where it is secured thereto by a pin 34. Another operating handle 35 is also fitted on one end of a shaft 36 rotatably mounted on the upwardly extending flanges 24' of the lower horizontally extending portion 23' of the balk member 20' and held in place thereon by pin 36'. The shaft 36 also passes through a hole 62' in the other end of the lower connecting link 44', and is secured to the link in any suitable manner. The upper horizontal portion 21' of the balk member 20' is provided with cut-out portions 29 and 63 at its adjoining end; and cut-out portions 29' and 63' are provided on the lower horizontal portion 23 of the balk member 20 for a purpose which will hereinafter appear. To prevent the links 44 and 44' from being rotated, and held in a locked inoperative position, one of the pins 27 and 27' of the tie bars 26 and 26' may be inserted in holes 42 and 42' provided in the plates 25 and 25' of the balk members 20 and 20' respectively.

By providing the balk members 1 and 2 with one connector on each member including a connecting link and operating handle, the balk members may be connected together readily end to end. For so connecting the balk members of Figs. 1 to 11 inclusive, the ends of the balk members are brought together so that one operating handle 13 is mounted on the lower portion of the balk member 1 and the other operating handle 13' is mounted on the upper portion of the balk member 2. Upon operating the handles 13 and 13', the connector links 12 and 12' are rotated with the link shafts 14 and 14' to a horizontal position, while for locking the connecting links 12 and 12' in inoperative position, one of the pins 9 on the upper tie bar 8 is placed in holes 39 in side plates 6 of the balk member 1 and one of the pins 9' on the lower tie bar 8' is placed in holes 41 in the side plates 6' of the balk member 2 with the other pin 9 of the upper tie bar 8 engaging in holes 10 in the upper portions of the side plate 6 of the balk member 1 and the other pin 9' of the lower tie bar 8' engaging in holes 10'' in the side plate 6' of the balk member 2.

In forming a continuous balk construction the pins 9 of the upper tie bar 8 are removed from their carrying position in holes 10 and 39 in the balk member 1, and pins 9' of tie bar 8' are removed from their carrying position in holes 10'' and 41 in the balk member 2, thereby permitting connecting links 12 and 12' to be rotated by handles 13 and 13', respectively, through shafts 14 and 14'. Upon the operating handles 13 and 13' being turned until each connecting link 12 and 12' is in a horizontal position, the balk members 1 and 2 are shifted until a hole 11 in one end of the upper connector link 12, Fig. 6, is aligned with the holes 10 in the balk member 1, and a hole 11' in one end of the lower connector link 12' is in alignment with lower holes 10'' in the balk member 2. When these holes become in alignment, the pins 9 of the upper tie bar 8 are reinserted through the upper holes 10 and 10a in the balk members 1 and 2, with the pin 9 of the upper tie bar 8, which is inserted in the holes 10 of the balk member 1, passing through the hole 11 in one end of the upper link 12; and the other pin 9 of the tie bar 8, which is inserted in the upper holes 10a in the balk member 2 passes through the elongated opening 40 in the middle of the upper link 12. The pins 9' of the lower tie bar 8' are also reinserted in the lower holes 10', 10'', of the balk members 1 and 2, with one of the pins 9' in the holes 10'' of the balk member 2 passing through the hole 11' in one end of the lower link 12', and the other pin 9' of the tie bar 8' in holes 10' of balk member 1 passing through the elongated hole 40' in the middle of the lower link 12'. Lock clips 18 are then slipped over the free ends of the tie bar pins.

When the balk members 1 and 2 are so connected and used as a continuous beam structure, compression in the upper horizontal flanges 3 and 3' thereof and tension in the bottom flanges 4 and 4', are carried through the connector locking shafts 14 and 14' into the connector links 12 and 12', through the pins 9 of the tie bar 8 in the holes 10 in the upper portion of the balk member 1, and through the pin 9' of the tie bar 8' in the holes 10'' in the lower portion of the balk member 2. The pin 9 of upper tie bar 8 which is placed through holes 10 on the upper portion of the balk member 1, and which also passes through the elongated hole 40 in the middle of the upper link 12, and the pin 9' of the lower tie rod 8' which is placed through hole 10' in the lower portion of the balk member 1, and passes through the elongated middle hole 40' in the middle of the lower connecting link 12', are used only to take vertical shear through the balk joint and do not take any of the moment forces. This is made possible by the elongated holes 40 and 40' in the middle of the upper and lower connector links 12 and 12' and the holes 10 on the upper portion of the balk member 1 and the lower holes 10' and 10'' in the lower portions of the balk members, so that no stress is placed on the tie bars 8 and 8'.

Figure 3:
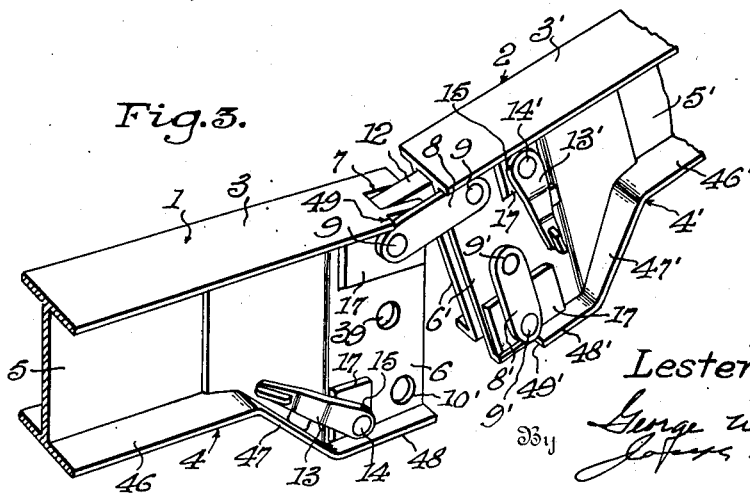
Fig. 3 is a perspective view of the assembly of Fig. 1, but showing parts of the connector in inactive position and the remaining parts of the connector serving as a hinge joint between the balk members.

In order to form a hinged joint construction for use as an approach span to a bridge for river banks or trestles, either the upper tie bar 8 including its pins 9, or the lower tie bar 8' including its pins 9', may be removed from the balk members 1 and 2. If the balk members 1 and 2 are to be hinged above the horizontal plane, one of the pins 9' on the lower tie bar 8' may be inserted in the holes 41 in the balk member 2. The lower connecting link 12' is then turned back into the balk member 1 between the side plates 6 by the operating handle 13, leaving the upper link 12 connected and the upper tie bar 8 and its pins 9 in place, as illustrated in Fig. 3. The balk member 1 may be hinged about a pin 9 of the upper tie bar 8 inserted in the upper holes 10 in the balk member 1, with the cut-out portions 7 and 49 in the adjoining end of the upper horizontal portion 3 of the balk member 1 permitting this movement. Should it be desired to have the balk members 1 and 2 hinged below the continuous horizontal plane of the top surfaces of the members, one of the pins 9 of the upper tie bar 8 may be inserted in the hole 39 in the balk member 1, or the tie bar 8, and its pins 9 may be removed from the balk member 1. The upper connecting link 12 is then turned back into the balk member 2 by the operating handle 13'. This hinging of the balk members 1 and 2 below the said horizontal plane is permitted by the open lower portions of the side plates 6 and the cut-out portion 49' in the adjoining end in the lower portion of side plate 6' of balk member 2.

The modified form of balk members 20, 20' as illustrated in Figs. 12 to 18, inclusive, are provided with a connector embodying the same structural details and operating in the same manner as disclosed in Figs. 1 to 11 inclusive, with the operating handle 31 being on the upper portion of balk member 20, and the operating handle 35 being on the lower portion of the balk member 20'. One of the pins 27 of the upper tie bar 26 is adapted to engage in a hole 42 in the balk member 20 for holding the upper connecting link 44 in a locked position; and a pin 27' on the lower tie bar 26' is adapted to engage in a hole 42' in the balk member 20' for holding the lower link 44' in locked position. To form a hinged joint construction for use as an approach span to a bridge for river banks or trestles, either the upper tie bar 26 including its pins 27, or the lower tie bar 26' including its pins 27', may be removed from the balk members 20 and 20'. By removing the lower tie bar 26' and its pins 27' from the balk members 20 and 20', the balk members may be hinged above the said horizontal plane, with the cut-out portions 29 and 63 on the adjoining end of the upper portion of the balk member 20' permitting this movement; and to hinge the balk members 20 and 20' below the horizontal plane through the top surfaces of the members, the lower tie bar 26' and its pins 27' are reinserted in balk members 20 and 20' and the upper tie bar 26 and its pins 27 removed from the balk members, with the lower cut-out portions 29' and 63' on the adjoining end of the balk member 20' permitting this movement below the said horizontal plane.

Having thus described my invention, what I claim as new and wish to secure by Letters Patent is:

1. A structural assembly for bridges, comprising the combination with a series of balk-beams connected in end-to-end relation to form a continuous balk structure, of connecting means movably mounted on one end of one of the beams, a recess in an adjacent end of an adjacent beam receiving the connecting means, a pivotal mounting for the connecting means secured to the beam enabling the connecting means to be rotated between connecting and inactive positions, and locking instrumentalities removably mounted on the beams and extending between adjacent beams and having spaced parallel pins extending through aligned apertures in adjacent ends of the adjacent beams and through the ends of the connecting means received therein, thereby releasably locking the beams together.

2. A structural assembly for bridges, comprising the combination with a plurality of beams connected in series in end-to-end relation, of connecting means including a connecting link pivotally mounted on each end of the beams, whereby the links can be rotated into operative and inoperative positions, the said links extending into a complemental recess in the adjacent end of an adjacent beam for receiving an opposite connecting link, and removable tie-bars mounted on the beams and extending between adjacent beams, the said links having spaced parallel locking pins extending into corresponding apertures provided therefor in the connecting links and adjacent beam ends to secure the connecting links and beams in connected position.

3. A structural assembly for bridges, comprising the combination with a plurality of beams connected together at adjacent ends, and having spaced vertically extending plates at their adjacent ends, of means for connecting together adjacent ends of the beams, the means including links between said plates on upper and lower portions of the plates, one of each of the links being rotatably mounted on one of the adjacent ends, tie-bars extending between adjacent beams and provided with spaced parallel pins on upper and lower portions of the plates, the said pins extending through aligned openings in said plates and links, means on said tie-bar pins for holding them on the plates, a shaft rotatably mounted in upper portions of said plates of one of the beams, and a second shaft rotatably mounted in lower portions of the plates of another of said beams, one of each of the shafts passing through an opening in one end of each of the connecting links and secured thereto, and an operating lever for each link mounted on one end of each of said shafts for rotating the links by means of the shafts upon the removal of said tie-bars and pins from the ends of the beams.

4. A structural assembly for bridges comprising the combination with a plurality of beams connected together at adjacent ends, of spaced vertically extending plates on the beams, and means for connecting adjacent ends of the beams, the connecting means including links mounted between the plates at upper and lower positions thereof, pivotal mountings for the links, the said pivotal mountings extending through holes provided therefore in the plates, whereby the connecting links can be rotated into operative and inoperative positions, upper and lower tie-bars extending between adjacent beams and housing spaced parallel locking pins extending through aligned apertures in the plates and links for rigidly securing the beams together, means on the tie-bar pins for holding them on the plates, a shaft rotatably mounted on an upper portion of the plates of one of the beams, a second shaft rotatably mounted on lower portions of the plates of the adjacent beam, one of each of the shafts passing through an opening provided therefor in one end of the connecting links, and a handle mounted on one end of each of the shafts for rotating the links by means of the shafts upon the removal of the tie-bars and pins from the ends of the beams.

5. A structural assembly for bridges comprising balk beams connected in end-to-end relation, means for connecting adjoining ends of the balk beams together, said means including a connecting link rotatably mounted on each of said ends, removable tie-bars having spaced pins thereon mounted on the supporting members between said ends, the tie-bar pins extending through openings in the ends, with one of each of the pins of each of the tie-bars passing through an elongated opening in the middle of one of each of the said links, and another of the pins of each of the tie-bars passing through an opening in one end of one of each of said links, shafts rotatably mounted on said ends of the supporting members, one of each of said shafts passing through an opening in one of each of the other ends of said links and secured thereto, and an operating handle mounted on each of said shafts for rotating the links through the shafts upon the removal of said tie-bars and pins from said ends of the supporting members.

6. A structural assembly for bridges comprising balk members connected in end-to-end relation, the said balk members comprising spaced vertically extending plates on the ends of the balk members opened at their lower portions, lower flanges and horizontal upper portions on the balk members, cut-out portions on an upper horizontal portion of one of said balk members at its adjoining end and a cut-out portion on the lower portion of another of said balk members, the said assembly of connected balk members comprising connecting means interconnecting contiguous ends of the balk members, the means including a plurality of connecting links extending between the plates of the adjoining balk members, one of the links being rotatably mounted on the upper portions of the plates and another of the links being rotatably mounted on the lower portions thereof, tie-bars having spaced pins thereon, one of the tie bars and pins therefor being removably mounted on the upper portions of the plates between the ends of adjoining balk members, and another of the tie-bars and pins being removably mounted on the lower portions of the plates between the ends of adjoining balk members, whereby upon the removal of the lower tie bar and pins, the adjoining ends of the balk members become hingedly connected for moving said balk members relatively upwardly above the horizontal plane of the longitudinal axis of the balk member, the cut-out portion on the adjoining end of the upper horizontal portion of one of the balk members permitting this movement, the said tie bar and pins removed from the lower portions of the plates may be reinserted in the said ends, and the said upper tie bar and pins in carrying position may be removed from the upper portions of said plates, thus allowing the upper portions of the adjoining ends of the balk members to be hinged below the said horizontal plane, a shaft rotatably mounted on the upper portion of the plates of one of said balk members, and a second shaft rotatably mounted on the lower portion of the plates of another of said balk members, one of each of said shafts extending through one end of each of said links and secured thereto and operating handles mounted on the said shafts for rotating the links through the said shafts upon the removal of said tie bars and pins from said adjoining ends of the balk members.

7. A structural assembly for bridges comprising balk beams connected in end-to-end relation, the balk beams having horizontally extending upper and lower flanges, the upper flanges being provided with spaced downwardly extending side flanges and said lower portions being provided with spaced upwardly extending side flanges, the said balk beams of the structural assembly comprising spaced vertically extending plates between the horizontally extending upper and lower flanges and the side flanges, an upper connecting link rotatably mounted on one of the balk beams and extending between the adjoining ends of the balk beams, a lower connecting link rotatably mounted on another of the balk beams and extending between the adjoining ends, upper and lower tie-bars having spaced pins thereon removably mounted on and between the adjoining ends, a shaft rotatably mounted on the upper side flanges of one of said supporting members, a second shaft rotatably mounted on the lower side flanges of another of said supporting members, one of each of the shafts extending through an opening in one end of each of the links and secured thereto, and operating means mounted on one end of the shafts for rotating the links through the shafts upon removal of the tie-bars and pins from the supporting members.

8. A structural beam adapted to be interconnected with similar beams in end-to-end alignment to form a continuous structural beam assembly, which comprises an end housing on each end of the beam, connecting links pivoted in each housing and enclosed therein when in inoperative position and extending outwardly from the housing when projected in connecting position, the said beam having top and bottom flanges extending in parallelism longitudinally of the beam, one of the flanges having an end recess adapted to receive a connecting link of a contiguous beam of the assembly, operating shafts carrying the said links and mounted in and extending through the housings, operating levers secured to the shafts for turning the said shafts for actuating the said links, tie bars mounted on the beam and adapted to extend across the juncture between contiguous beams when assembled, and spaced parallel locking pins carried by the tie bars adapted to be received in corresponding holes provided therefor in the connecting links of the beam and in corresponding holes in the housing in alignment with the holes in the connecting links.

9. A balk assembly for a bridge structure, comprising balk beams adapted to be interconnected in end-to-end alignment, the said balk beams comprising an end housing on each end of the balk beams, rotatably mounted connecting links pivoted in the said end housings and enclosed therein when in inoperative position, the connecting links of successive beams being oppositely vertically spaced and extending outwardly from the housings when projected in connecting position, adjacent ends of adjacent beams being provided with recesses complemental to the said links for receiving the links when the latter are in extended position, operating shafts carrying the said links and mounted in the housings, and operating levers secured to the shafts for turning the said shafts for rotatably actuating the said links.

10. A balk assembly for a bridge structure comprising balk beams adapted to be interconnected in end-to-end alignment, the said balk beams comprising an end housing on each end of each of the balk beams, pivotally mounted connecting links housed in the said end housings when in inoperative position, the connecting links of successive beams being oppositely vertically spaced and extending in opposite directions when projected in connecting position, adjacent ends of the successive beams being provided with recesses complemental to the said links for receiving the links when the latter are in extended position, operating shafts for actuating the links, operating levers mounted on the shafts for rotating the shafts to actuate the links, the said connecting links and complemental end recesses being so arranged as to enable either end of one of the balk beams to be connected to either end of the succeeding balk beam, tie bars interconnecting the adjacent ends of successive beams, and locking pins on the tie bars entering openings provided therefor in an end housing of one beam and the corresponding connecting link of the successive beam.

11. A structural assembly for bridges, comprising the combination with a plurality of beams connected in series in end-to-end relation, of connecting means for the beams including connecting link means rotatably mounted in each of the beams and movable between inoperative position housed in the ends of each beam and operative position extended from the said ends, each end of the beams being provided with a complemental recess receiving corresponding opposite connecting link means, and tie bars removably mounted on the beams and provided with similarly extending locking pins projecting into the connecting link means and adjacent beam for securing the said connecting link means and adjacent beams in connected position.

12. A structural unit comprising a beam including top and bottom flanges, a web interconnecting the flanges and end portions adapted to receive and to interconnect with corresponding end portions of similar beams in end-to-end relation to form a continuous structural assembly, each of the said end portions including a pair of side plates having portions thereof integral with the web and having other portions extending beyond the web to form a channeled end housing on the beam, the said housing being provided with a plurality of spaced holes or apertures, a link pivotally mounted in the housing, a pivot shaft for the link extending through the housing, lever means on the shaft for turning the shaft and link between a retracted inoperative position enclosed in the housing and operative connecting position projecting from the housing, the said link being provided with holes registering with selected holes in the housing, and a tie bar removably mounted on the housing provided with spaced locking pins removably received in selected holes in a side plate of the housing for removably retaining the tie bar in a retracted position on the side plate intermediate the said lever and the end of the beam, the said tie bar being shiftable from the said position into another position with an end of the tie bar projecting beyond the housing and the end of the beam while releasing the lever for enabling the latter to be turned for extending the link from the housing.

13. A structural unit comprising a beam including top and bottom flanges, a web interconnecting the flanges, and end portions adapted to receive and to interconnect with corresponding end portions of similar beams in end-to-end successive relation to form a continuous structural assembly, each of the said end portions including a pair of side plates having portions thereof integral with the web and having other portions extending beyond the web to form a channeled end housing on the beam, the said housing being provided with a plurality of spaced holes or apertures, a link pivotally mounted in the housing, a pivot shaft for the link extending through the housing, lever means on the shaft for turning the shaft and link between a retracted inoperative position enclosed in the housing and operative connecting position projecting from the housing, the said link being provided with holes registering with selected holes in the housing, and a tie bar removably mounted on the housing provided with spaced locking pins removably received in selected holes in a side plate of the housing for removably retaining the tie bar in a retracted position on the side plate and intermediate the said lever on the link shaft and the end of the beam and restraining the said lever when the lever is turned to retract the link into the housing, the said tie bar being shiftable responsively to removal of the locking pins from the holes into a position with an end of the tie bar projecting beyond the end of the beam while releasing the lever for enabling the latter to be turned for projecting the link from the housing.

14. A structural unit for a bridge comprising a beam including top and bottom flanges, a web interconnecting the flanges and enlarged offset end portions adapted to receive and to interconnect with corresponding end portions of similar beams in end-to-end relation to form a continuous structural assembly, each of the said end portions including a pair of side plates having portions thereof integral with the web and having other portions extending beyond the web to form a channeled end housing on the beam, the said housing being provided with a plurality of spaced holes or apertures, a link pivotally mounted in the housing adjacent to one of the flanges of the beam, a pivot shaft for the link extending through the housing, lever means on the shaft for turning the shaft and link between a retracted inoperative position enclosed in the housing and operative connecting position projecting from the housing, the said link being provided with holes therethrough registering with selected holes in the housing, and a tie bar mounted on the housing providing with spaced locking pins removably received in selected holes in the housing and retained thereby for holding the tie bar substantially parallel with the end of the beam and in advance of the lever means when the link is in retracted position enclosed in the housing.

15. A beam-like member having a web and opposite end portions adapted to receive and to connect thereto corresponding end portions of similar beams to form a structural unit, the said end portions comprising a pair of side plates having a portion rigidly secured to the web, remaining portions of the side plates extending beyond the web and defining a channel therewith, the said side plates having a plurality of spaced holes therein, a link in the channel, means extending through a first set of the holes for pivotally mounting the link in the channel, means extending through a second set of holes and the link for locking the link to the channel, the second set of holes being in longitudinally spaced relation to the first set, a third set of holes being in vertically spaced relation to the second set of holes, a tie bar removably mounted in the third set of holes and having a pair of spaced locking pins removably received in the third set of holes, the pivoted link in one of the end portions of the beam being adjacent to the lower edge of the web and a similar pivoted link in the opposite end portion of the beam is adjacent to the top edge of the web.

LESTER P. FROST.

References Cited in the file of this patent

UNITED STATES PATENTS

| Number | Name | Date |
|---|---|---|
| 320,079 | Martin | June 16, 1885 |
| 1,448,854 | Martin | Mar. 20, 1923 |
| 1,467,696 | Stewart | Sept. 11, 1923 |
| 1,887,252 | Thomas | Nov. 8, 1932 |
| 1,941,348 | Hathorn | Dec. 26, 1933 |
| 2,171,326 | Tarbet | Aug. 29, 1939 |
| 2,291,014 | Woody | July 28, 1942 |